United States Patent [19]

Oriente et al.

[11] Patent Number: 5,206,998
[45] Date of Patent: May 4, 1993

[54] BARBEQUE UTENSIL KIT

[76] Inventors: Jack P. Oriente; Joanie Oriente, both of 183 W. Crescent Ave., Allendale, N.J. 07401

[21] Appl. No.: 860,322

[22] Filed: Mar. 30, 1992

[51] Int. Cl.[5] .......................... B26B 1/00; B26B 3/00; A47J 43/28
[52] U.S. Cl. ........................................ 30/142; 30/322; 30/129
[58] Field of Search .......................... 30/142, 322, 129; 223/89; 206/4

[56] References Cited

U.S. PATENT DOCUMENTS

| | | | |
|---|---|---|---|
| 1,573,620 | 2/1926 | Allston | 206/4 |
| 2,178,971 | 11/1939 | Sax | 30/129 |
| 2,455,623 | 12/1948 | Stone | 30/322 |
| 2,620,102 | 12/1952 | Bremer | 223/89 |
| 2,701,083 | 2/1955 | Welker | 223/89 |
| 3,906,632 | 9/1975 | Oppenheimer | 30/322 |
| 4,332,409 | 6/1982 | Stachowicz | 30/142 |
| 4,707,922 | 11/1987 | Hosak-Robb | 30/322 |
| 4,835,864 | 6/1989 | Tang | 30/322 |

Primary Examiner—Douglas D. Watts
Assistant Examiner—Paul M. Heyrana, Sr.
Attorney, Agent, or Firm—Leon Gilden

[57] ABSTRACT

A utensil kit is arranged to include a spatula, bifurcated fork, and tong structure, each having telescopingly mounted heads secured to forward tooth portions telescopingly received within support tubes. Spring members are arranged to bias the forward tubes in an extended orientation relative to the support tube structure.

4 Claims, 4 Drawing Sheets

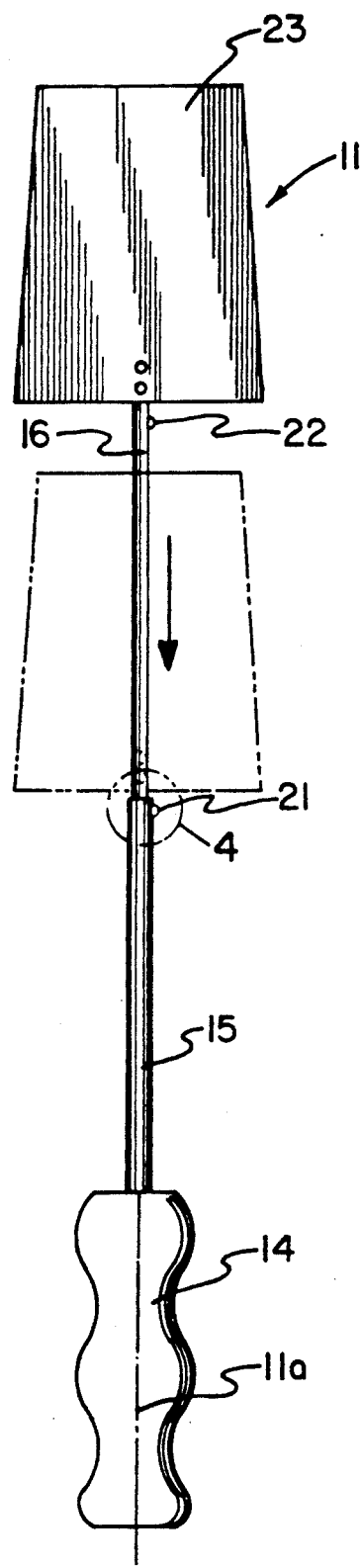
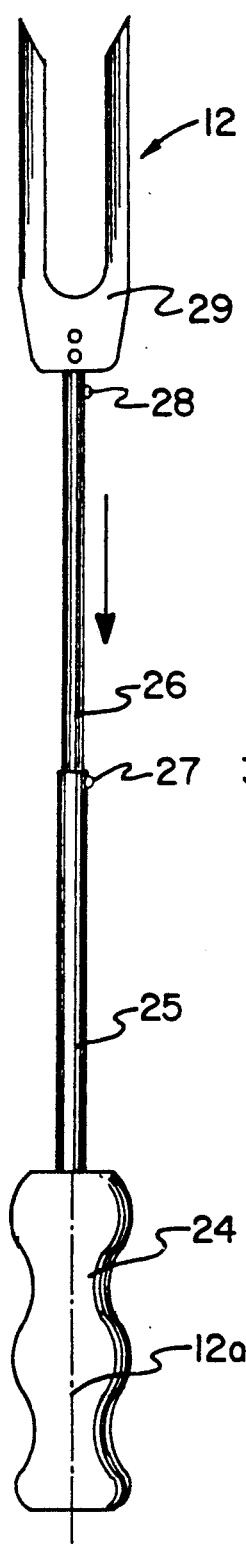
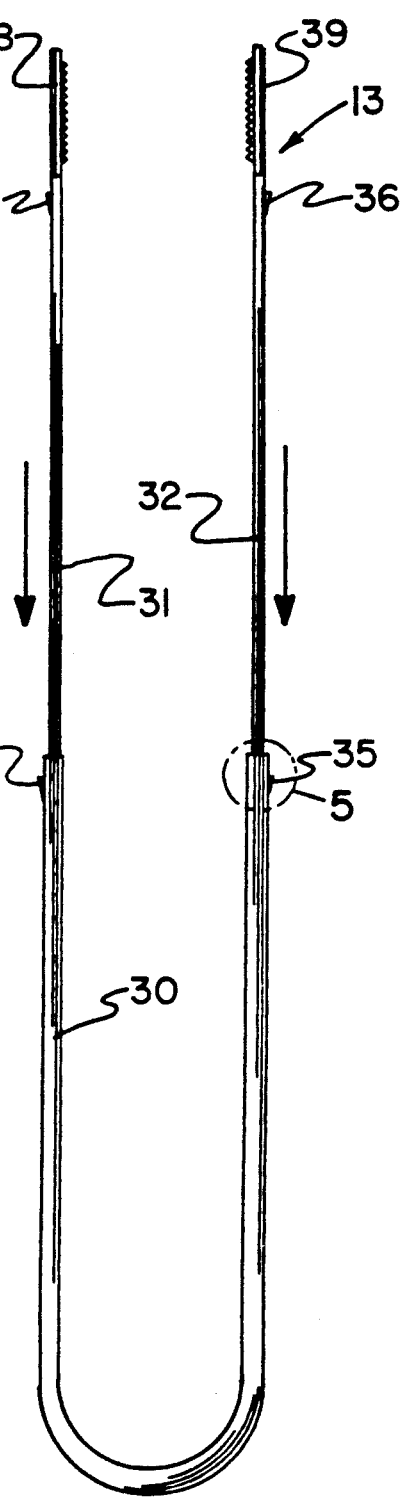

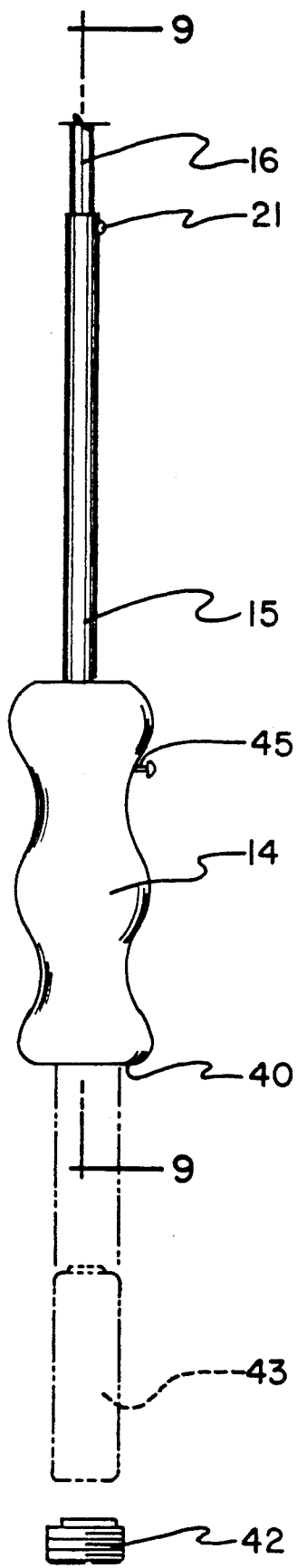
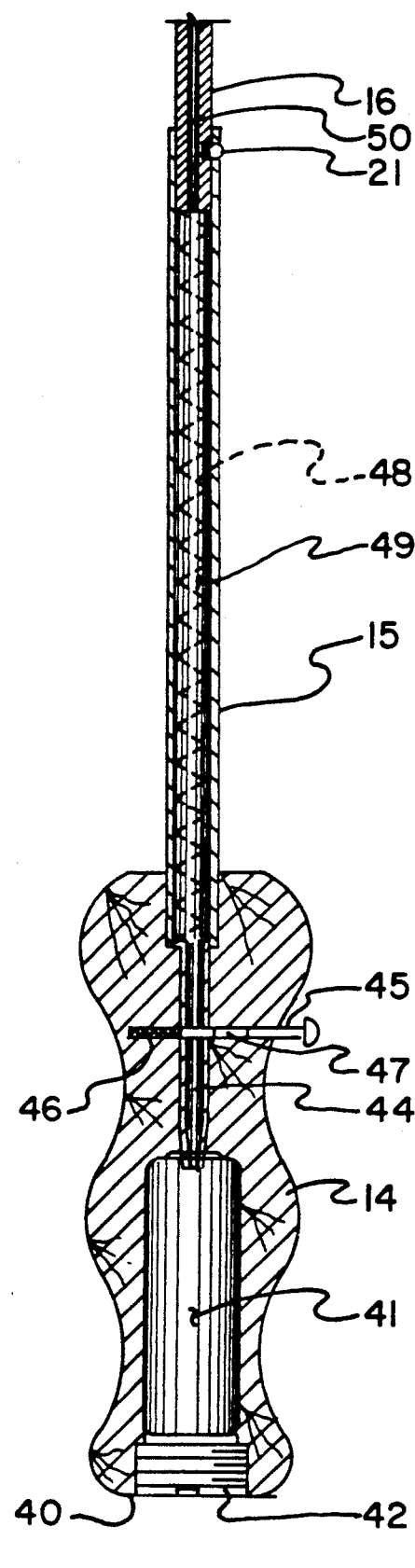

BARBEQUE UTENSIL KIT

BACKGROUND OF THE INVENTION

1. Field of the Invention

The field of invention relates to utensil structure, and more particularly pertains to a new and improved barbeque utensil kit wherein the same provides for compact utensils arranged for ease of storage during periods of non-use.

2. Description of the Prior Art

Utensil structure of various types are utilized throughout the prior art to accommodate grilling, such as in a barbeque scenario. Such apparatus is exemplified in U.S. Pat. No. 4,848,816 to Anderson setting forth a hamburger grill spatula including forwardly projecting tines relative to a rear base support.

U.S. Pat. No. 4,325,158 to Divish sets forth a spatula scraper attachment for cooking grills in cooperation with various grilling utensils.

U.S. Pat. No. 4,095,832 to Slinker sets forth a rotating cooking spatula formed with a rotary head structure.

As such, it may be appreciated that there continues to be a need for a new and improved barbeque utensil kit as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of utensil apparatus now present in the prior art, the present invention provides a barbeque utensil kit wherein the same is arranged to provide for compact barbeque utensils arranged for use in a barbeque grilling environment permitting compactness of storage and transport of the organization when not in use. As such, the general purpose of the present invention, which will be described subsequently in greater detail, is to provide a new and improved barbeque utensil kit which has all the advantages of the prior art barbeque utensil structure and none of the disadvantages.

To attain this, the present invention provides a utensil kit arranged to include a spatula, bifurcated fork, and tong structure, each having telescopingly mounted heads secured to forward tooth portions telescopingly received within support tubes. Spring members are arranged to bias the forward tubes in an extended orientation relative to the support tube structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved barbeque utensil kit which has all the advantages of the prior art barbeque utensil structure and none of the disadvantages.

It is another object of the present invention to provide a new and improved barbeque utensil kit which may be easily and efficiently manufactured and marketed.

It is a further object of the present invention to provide a new and improved barbeque utensil kit which is of a durable and reliable construction.

An even further object of the present invention is to provide a new and improved barbeque utensil kit which is susceptible of a low cost of manufacture with regard to both materials and labor, and which accordingly is then susceptible of low prices of sale to the consuming public, thereby making such barbeque utensil kits economically available to the buying public.

Still yet another object of the present invention is to provide a new and improved barbeque utensil kit which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view of the spatula member of the invention.

FIG. 2 is an orthographic view of the fork member of the invention.

FIG. 3 is an orthographic view of the tong member of the invention.

FIG. 8 is an orthographic view of a modified handle and support tube structure utilized by the invention.

FIG. 9 is an orthographic view, taken along the lines 9—9 of FIG. 8 in the direction indicated by the arrows.

DESCRIPTION OF THE PREFERRED EMBODIMENT

Figure 4:
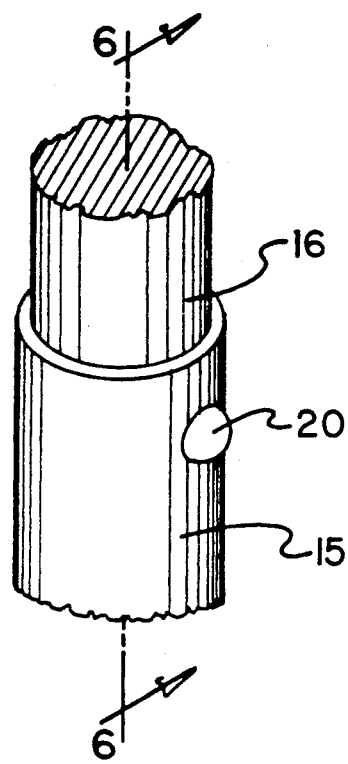
FIG. 4 is an isometric illustration of section 4 as set forth in FIG. 1.

With reference now to the drawings, and in particular to FIGS. 1 to 13 thereof, a new and improved barbeque utensil kit embodying the principles and concepts of the present invention and generally designated by the reference numerals 11, 12, and 13 will be described.

More specifically, the barbeque utensil kit apparatus of the instant invention essentially comprises a spatula 11, a fork 12, and tongs 13 utilized in a barbeque grilling scenario, wherein such structure is accordingly afforded elongated support tube construction to distance an individual relative to an open flame for safety and comfort.

The spatula 11 includes a first handle 14 having a first support tube 15 coaxially aligned relative to the first handle 14 along the first axis 11a, with a first forward tube 16 coaxially and telescopingly received within the support tube 15. The first forward tube 16 includes an interior end face 17 positioned within the support tube 15, with a forward tube spring cavity 18 orthogonally oriented relative to the axis 11a mounting a first spring 19 therewithin to include a first detent sphere 20. A similar construction mounts a second detent sphere 22 adjacent the spatula plate 23 to permit retraction and containment of the first forward tube 16 within the first support tube 15. Each spring cavity 18 includes a spring cavity spring 19 therewithin to bias the associated spheres 20 and 21 exteriorly of the spring cavities.

The fork construction 12 is of a similar construction utilizing a bifurcated fork head 20 mounted to a forward distal end of the second forward tubes 26 that is telescopingly received within the second support tube 25 that in turn is coaxially mounted to the second handle 24 about the second axis 12a in a coaxially aligned relationship. Third and fourth detent spheres 27 and 28 are mounted within respective spring cavities 18 of a type as illustrated in the FIG. 6 and described above.

Figure 6:
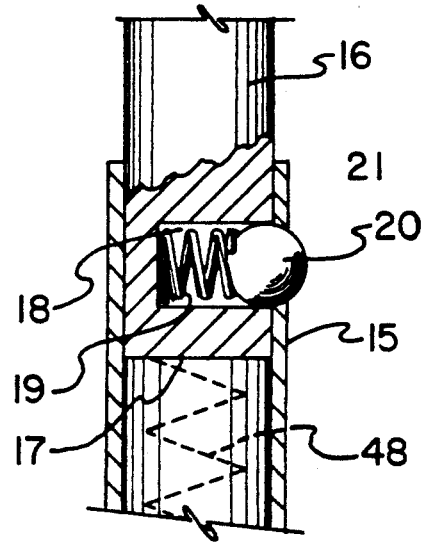
FIG. 6 is an orthographic view, taken along the lines 6—6 of FIG. 4 in the direction indicated by the arrows.
Figure 7:
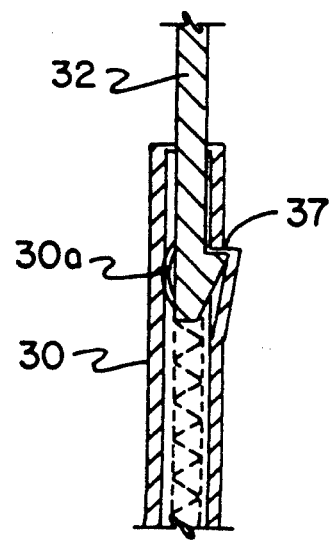
FIG. 7 is an orthographic view, taken along the lines 7—7 of FIG. 5 in the direction indicated by the arrows.
Figure 10:
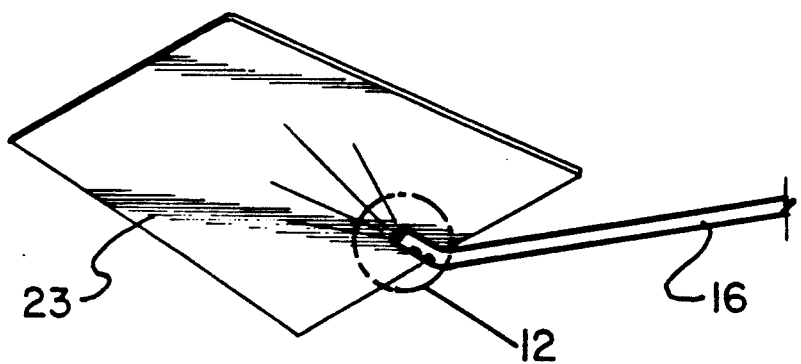
FIG. 10 is an isometric illustration of the outlet end of the modified forward tube structure.
Figure 11:
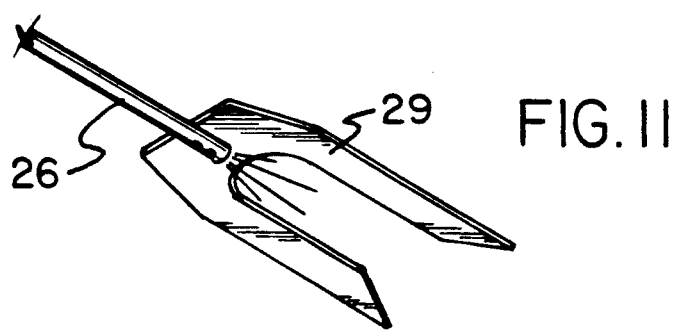
FIG. 11 is an isometric illustration of the forward tube structure of the fork member.
Figure 12:
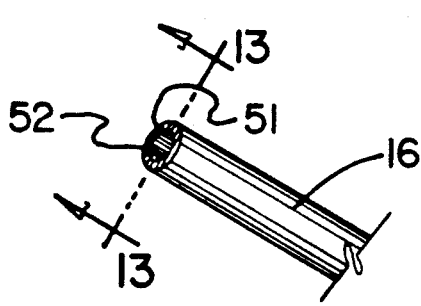
FIG. 12 is an isometric illustration of section 12 as set forth in FIG. 10.
Figure 13:
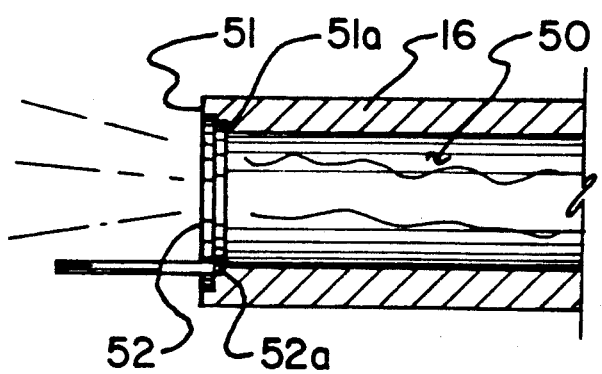
FIG. 13 is an orthographic view, taken along the lines 13—13 of FIG. 12 in the direction indicated by the arrows.

As illustrated in the FIGS. 6, 7, and 9 for example, each forward tube is spring-biased in a projected manner relative to an associated support tube utilizing a support tube biasing spring 48 mounted between the forward tube interior end face and a lower distal end of the support tube.

Figure 5:
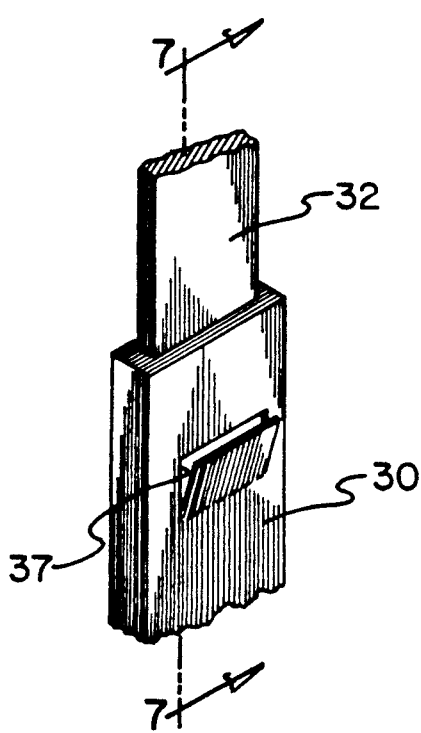
FIG. 5 is an isometric illustration of section 5 as set forth in FIG. 3.

The tong structure 13 includes a U-shaped tubular base 13 including tong first and second legs 31 and 32 telescopingly received within respective legs of the U-shaped tubular base 30. The legs of the tubular base are arranged in a parallel relationship and are formed of a shape retentent material to permit deflection of the U-shaped tubular base 30 and their return to original configuration, such as illustrated in FIG. 3. The first and second legs include respective first and second detent abutment flanges 33, 34, and 35, 36 directed through base openings 37, in a manner such as illustrated in FIG. 5, utilizing abutment flange springs 30a to bias the abutment flanges relative to the openings 37. The first and second legs include first and second engaging heads 38 and 39 arranged in confronting relationship relative to one another, as illustrated in FIG. 3, to permit grasping of various food components therebetween.

A modified handle structure as illustrated in the FIGS. 8 and 9 is for use with the spatula and fork construction formed with a first handle cavity 41 coaxially received within the associated handle axis and directed into the handle rear wall 40. The handle cavity plug 42 removably mounted relative to the handle rear wall 40 permits selective replacement of a halon gas cylinder 43 therewithin.

A halon gas cylinder 43 is complementarily received within the first handle cavity 41 and in pneumatic communication with a handle conduit 44 coaxially directed through the first handle 14 along with a handle conduit 44 that in turn is aligned with a support tube conduit 49, in turn aligned with a forward tube conduit 50. A valve plate 45 orthogonally oriented relative to the axis 11a is mounted within the handle 14 and valve spring 46 biasing a valve plate opening 47 in a displaced orientation relative to the handle conduit 44, whereupon manually depressing the valve plate 45 coaxially aligns the valve plate opening 47 with the handle conduit 44 permitting halon gas to be directed through the handle, support tube 15, and forward tube 16 and their associated conduits. The halon gas is directed exteriorly of the forward tube structure through a forward tube outlet end 51 having the closure plate 52, including a closure plate spring hinge 52a to normally bias the closure plate in a closed manner overlying the outlet end opening 51a permitting debris from entering the forward tube conduit 50. In this manner, the fire extinguishing halon gas may be directed upon a fire as may arise in an outdoor cooking scenario.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A barbeque utensil kit, comprising,
a spatula member, a fork member, and a tong member, the spatula member including a first handle mounting a first support tube, with the first handle and the first support tube coaxially aligned about a first axis, and the first support tube telescopingly receiving a first forward tube therewithin, and the first forward tube having a spatula plate fixedly mounted to a forward distal end of the first forward tube spaced from the first handle, and the first support tube including a first tube opening directed through the first support tube adjacent a first support tube free distal end, and the first forward tube including an interior face positioned within the first support tube, and spring means mounted between the first forward tube interior face and the first handle tube bias the first forward tube in an extended orientation relative to the first support tube, and the first support tube including spaced first and second detent spheres mounted within the first forward tube cooperative with the first support tube opening to secure the first forward tube in a predetermined orientation relative to the first support tube, and the fork member including a second handle, the second handle including a coaxially mounted second support tube, the second support tube mounting slidably a second forward tube telescopingly within the second support tube, and the second forward tube having a bifurcated fork head mounted to a forward distal end of the second forward tube, with the second forward tube including respective third and fourth detent spheres mounted from the second forward tube, and the second support tube having a second support tube opening cooperative with the third and fourth detent spheres selectively, and the tong member including a U-shaped tubular base having tong first and second legs telescopingly received within the U-shaped tubular base, and the tong first leg and the tong second leg including respective first and second engaging heads for securement of a food component therebetween, and the tong first leg including respective tong first leg first and second detent abutment flanges, and a tong second leg including tong second leg first and second detent abutment flanges cooperative with the U-shaped tubular base to permit selective extension and retraction of the tong first leg and tong second leg within the U-shaped tubular base. and at least the first handle includes a first handle cavity directed coaxially into the first handle, with the first handle including a first handle rear wall having a first handle cavity directed into the first handle from the first handle rear wall, and a first handle cavity plug removably mounted relative to the first handle rear wall, and a halon gas cylinder complementarily received within the first handle cavity, and the first handle including a first handle conduit in pneumatic communication with the halon gas cylinder, and the first support tube including a first support tube conduit in pneumatic communication with the first handle conduit, and the first forward tube including a first forward tube conduit in pneumatic communication with the first support tube conduit.

2. A utensil kit as set forth in Claim 1 including a valve plate reciprocatably mounted within the first handle orthogonally oriented relative to the first axis, the first valve plate including a first valve plate opening displaced from the first handle conduit in the first position and the valve plate opening coaxially aligned with the first handle conduit and a second position, and the valve plate including a valve plate spring captured between a lower distal end of the valve plate within the first handle to bias the valve plate to the first position.

3. A utensil kit as set forth in claim 2 wherein the first forward tube includes a first forward tube outlet end positioned below the spatula plate, with the outlet end including a closure plate door mounted within an outlet end opening of the outlet end, and the closure plate door including a spring hinge to bias the closure plate door within the outlet end opening.

4. A barbeque utensil, comprising, a spatula member, the spatula member including a first handle mounting a first support tube, with the first handle and the first support tube coaxially aligned about a first axis, and the first support tube telescopingly receiving a first forward tube therewithin, and the first forward tube having a tubular plate fixedly mounted to a forward distal end of the first forward tube spaced from the first handle, and the first support tube including a first tube opening directed through the first support tube adjacent a first support tube free distal end, and the first forward tube including an interior face positioned within the first support tube, and spring means mounted between the first forward tube interior face and the first handle tube bias the first forward tube in an extended orientation relative to the first support tube, and the first support tube including spaced first and second detent spheres mounted within the first forward tube cooperative with the first support tube opening to secure the first forward tube in a predetermined orientation relative to the first support tube, and at least the first handle includes a first handle cavity directed coaxially into the first handle, with the first handle including a first handle rear wall having a first handle cavity directed into the first handle from the first handle rear wall, and a first handle cavity plug removably mounted relative to the first handle rear wall, and a halon gas cylinder complementarily received within the first handle cavity, and the first handle including a first handle conduit in pneumatic communication with the halon gas cylinder, and the first support tube including a first support tube conduit in pneumatic communication with the first handle conduit, and the first forward tube including a first forward tube conduit in pneumatic communication with the first support tube conduit.

* * * * *